United States Patent [19]

Davidovits et al.

[11] Patent Number: 5,352,427
[45] Date of Patent: Oct. 4, 1994

[54] GEOPOLYMERIC FLUORO-ALUMINO-SILICATE BINDER AND PROCESS FOR OBTAINING IT

[76] Inventors: Joseph Davidovits, 16 Rue Galilee, Saint Quentin, France, F-02100; Michel Davidovics, 5 Route de Villers, Pont Ste Maxence, France, F-60700; Nicolas Davidovits, 6 Rue Brison, Roanne, France, F-42300

[21] Appl. No.: 923,796
[22] PCT Filed: Mar. 5, 1991
[86] PCT No.: PCT/FR91/00176
§ 371 Date: Sep. 2, 1992
§ 102(e) Date: Sep. 2, 1992
[87] PCT Pub. No.: WO91/13840
PCT Pub. Date: Sep. 19, 1991

[30] Foreign Application Priority Data

Mar. 7, 1990 [FR] France .................. 90 02854

[51] Int. Cl.$^5$ .................................. C01B 33/26
[52] U.S. Cl. .................. 423/328.1; 423/327.1; 423/332; 106/286.5; 106/287.1
[58] Field of Search ............ 423/328.1, 331, 332, 423/327.1; 106/286.5, 287

[56] References Cited

U.S. PATENT DOCUMENTS 4,509,985  4/1985  Davidovits et al. ............ 106/624
4,888,311  12/1989  Davidovits et al. ............ 501/153
5,194,091  3/1993  Laney .......................... 106/628

Primary Examiner—Anthony McFarlane
Attorney, Agent, or Firm—Browdy and Neimark

[57] ABSTRACT

A geopolymeric fluoro-alumino-silicate binder is provided which makes it possible to manufacture items with excellent mechanical and heat resistance at temperatures between 250° C. and 650° C. with a variable coefficient of thermal expansion $5.10^{-6}/°C. < \Delta\text{-}\lambda < 35.10^{-6}/°C$. After curing, the geopolymeric compound thus obtained is a solid solution comprising:

a) a geopolymer of the fluoro-alkaline poly(sialate-disiloxo) type (M,F)-PSDS of formula $$(M)_n(-\underset{\underset{|}{O}}{\overset{|}{Si}}-O-\underset{\underset{|}{O}}{\overset{|}{Al}}-O-\underset{\underset{|}{O}}{\overset{|}{Si}}-O-\underset{\underset{|}{O}}{\overset{|}{Si}}-O-)_n, nF$$

b) an alkaline-alumino-fluoride $M_3AlF_6$ such as elpasolite $K_2NaAlF_6$;
c) a silicious phase $SiO_2$ of the Opal CT type, hydrous $SiO_2$;

where "M" represents the cations Na and/or K, and "n" the degree of polymerisation.

The process for obtaining fluoro-alumino-silicate geopolymer binders consists of reacting a geopolymeric resin obtained from a reactional mixture containing:

a) an aqueous solution of alkaline silicate with a molar ratio $M_2O:SiO_2$ comprised between or equal to $M_2O:SiO_2$ 1:4.0 and 1:6.5 the concentration of which is over 60% wt and where the initial viscosity at 20° C. is 200 centipoises, then increases but does not exceed 500 centipoises before 5 hours at 20° C.;
b) an alumino-silicate oxide $(Si_2O_5,Al_2O_2)$ in which the Al cation is in coordination (IV-V), as determined by the MAS-NMR spectrum for $^{27}Al$,
c) sodium fluosilicate $Na_2SiF_6$.

The mixture of the constituents a)+b)+c) has a water content lower than 30% wt and leads to a geopolymeric resin whose starting viscosity is in the 350–500 centipoises, with oxide molar ratios comprised between or equal to

| | | |
|---|---|---|
| $Al_2O_3:M_2O$ | 1:1.0 and 1:20 | |
| $Al_2O_3:SiO_2$ | 1:5.5 and 1:75, | |
| $M_2O:H_2O$ | 1:5.0 and 1:12.0 | |
| $Al_2O_3:F^-$ | 1:0.5 and 1:50 | | and then allowing the geopolymeric resin to cure.

20 Claims, No Drawings

GEOPOLYMERIC FLUORO-ALUMINO-SILICATE BINDER AND PROCESS FOR OBTAINING IT

FIELD OF INVENTION

The present invention relates to fluoro-alumino-silicate geopolymers and a method for obtaining such geopolymers.

BACKGROUND OF THE INVENTION

The geopolymeric alumino-silicates have been grouped in three families depending on the atomic ratio Si/Al which may be 1, 2 or 3. With the most commonly used simplified notation, a distinction is made between

| | | |
|---|---|---|
| poly(sialate) | $M_n(-Si-O-Al-O-)_n$ | or (M)-PS, |
| poly(sialate-siloxo) | $M_n(-Si-O-Al-O-Si-O-)_n$ | or (M)-PSS, |
| poly(sialate-disiloxo) | $M_n(-Si-O-Al-O-Si-O-Si-O-)_n$ | or (M)-PSDS. |

In several scientific papers, for instance "Geopolymer: room temperature ceramic matrix composites" published in *Ceram. Eng. Sci. Proc.*, 1988, Vol. 9 (7–8), pp. 835–41, cf. *Chemical Abstracts* 110-080924, or "Geopolymer Chemistry and Properties" published in *Geopolymer '88*, Vol. 1, pp. 18–23, University of Technology, Compiègne, France, and the international patent publication WO 88/02741 (U.S. Pat. No. 4,888,311), the prior art discloses the uses of poly(sialate)Mn(—Si—O—Al—O),(Na)—PS/(K)—PS and
poly(sialate-siloxo)Mn(—Si—O—Al—O—Si—O—),-(nA)—PSS/(K)—PSS.
It does not deal with any process for producing, poly(sialate-disiloxo)Mn(—Si—O—Al—O—Si-—O—Si—O—)n,(M)—PSDS.
Our corresponding application (FR90.02853, PCT/FR91/00177) filed on even date herewith, describes a process for producing,
poly(sialate-disiloxo) Mn(—Si-—O—Al—O—S—O—Si—O—)n,(M)—PSDS.

Alumino-silicate geopolymers have a tridimensional structure and belong to the category of zeolites and feldspathoids. For these materials it is known that thermal stability is a function of the ratio Si/Al. The higher this ratio, the higher their stability. Therefore, any worker in the field will understand the interest provided by the use of geopolymers of the type (M)-PSDS, i.e. Mn(—Si—O—Al—O—Si—O—Si-—O—), with the ratio Si/Al≧3
in comparison with
(M)-PSS, i.e. Mn(—Si—O—Al—O—Si—O—), with the ratio Si/Al=2 and
(M)-PS, i.e. Mn(—Si—O—Al—O—), with the ratio Si/Al=1.

SUMMARY OF THE INVENTION

The object of the invention is to provide a geopolymeric fluoro-alumino-silicate binder making it possible to manufacture items with excellent mechanical and heat resistance at temperatures between 250° C. and 650° C.

The geopolymeric binder of this invention is a fluoro-alumino-silicate geopolymer whose composition expressed in terms of oxides and in dehydrated form is:

where $M_2O$ is $K_2O$ and/or $Na_2O$, "x" has a value between 5.5 and 75 "y" has a value between 1.0 and 20, "w" has a value between 0.5 and 50. After curing, the geopolymeric compound thus obtained is a solid solution comprising:

(a) a geopolymer of the fluoro-alkaline poly(-sialatedisoloxo) type (M,F)-PSDS of formula

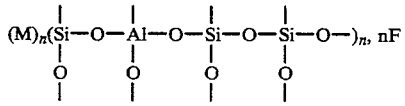

(b) an alkaline-alumino-fluoride $M_3AlF_6$ such as elpasolite $K_2NaAlF_6$;

(c) a silicious phase $SiO_2$ of the Opat CT type, i.e. a hydrous silica;

where "M" represents the cations Na and/or K, and "n" the degree of polymerization.

In the description of this invention, the term "geopolymer binder" or "hardening or a geopolymeric resin" relates to a hardening process which results from an internal polycondensation or hydrothermal reaction, as opposed to the hardening of alkaline-silicate-based binders which generally harden by simple drying.

The main object of this invention is to provide geopolymeric compounds with the ratio Si/Al≧3, with some examples where the ratio is as high as Si/Al=75.

The prior art tells us that silicon rich zeolites are, like all zeolites, produced in hydrothermal conditions and in very dilute reactive solutions. Molar ratio $M_2O:H_2O$ ranges from 1:50 to 1:100 and the zeolites obtained are very porous powders.

In contrast, geopolymers are binders which are used to agglomerate fillers or impregnate fibers and fabrics for the manufacture of ceramic-like items; the prior art concerning the fabrication of geopolymers, for instance the patents U.S. Pat. No. 4,349,386 (EP 026.687), U.S. Pat. No. 4,472,199 (EP 066.571), U.S. Pat. No. 4,888,311 (EP 288.502), tells us that the production of geopolymers is carried out in highly concentrated reactive medium and with a molar ratio $M_2O:H_2O$ which is higher than 1:15.5 for $Na_2O$ and in the order of 1:12.0 for $K_2O$.

There has been, so far, no known method for the production of a reactive mixture providing a ratio Si/Al≧3 associated with a molar ratio $M_2O:H_2O$ higher than 1:17.5. In this invention, the silicon involved in the chemical reaction comes from soluble alkaline silicate whose molar ratio $M_2O:SiO_2$ is lower than 1.0:4.0 and whose dry solid matter concentration is higher than 60% by weight. In contrast, industrial alkaline silicates are usually highly diluted with a dry matter concentration lower than 25% by weight and do not enable the production of the reactional mixture claimed in the present invention.

The second object of this invention is to provide a method for obtaining an alkaline silicate solution whose molar ratio $M_2O:SiO_2$ is lower than 1.0:4.0 and whose dry solid matter concentration is higher than 60% by weight.

Geopolymeric resins with high Si/Al ratios do not necessarily lead to the obtention of geopolymers with use temperature in the 250° C. -650° C. range, or even higher. The upper limit for the ratio Si/Al in poly(sialate-disiloxo) geopolymer, (M)-PSDS, resulting from the increase of the alkaline silicate concentration in the reactional mixture, is Si/Al=6.5. For values of Si/Al>6.5, the obtained ceramic items become unstable at high temperature, developing blister-like structures on their surface; this property is indicative of a pure highly fusible silicate phase that has not taken part to the tridimensional reticulation. The present invention is the result of the various efforts undertaken to avoid the production of this viscous phase which hinders any uses at temperatures higher than 300° C.

DETAILED DESCRIPTION OF EMBODIMENTS

The inventors were surprised to discover that the addition of common admixtures frequently used for the hardening of alkaline silicate solutions, such as sodium fluosilicate, $Na_2SiF_6$, leads to the production of geopolymeric materials bearing astoninshingly good properties at temperatures of between 250° C. and 650° C. The obtained binders belong to the alkaline fluoro-aluminosilicate family.

Compared with the geopolymers disclosed in the prior art, geopolymeric fluorooaluminosilicate compounds have a very high density, excellent mechanical properties at temperatures of between 250° C. and 650° C., and have very low shrinkage during the first heating phase.

In the prior art, geopolymeric compounds and geopolymer binders with Si/Al<3 must contain fine fillers to avoid the formation of cracks and the destruction of the materials at high temperature. This is due to the very high shrinkage which occurs to poly(sialate), M-PS, and poly(sialate-siloxo), M-PSS, geopolymers during dehydroxylation. This behaviour has been thoroughly described in the scientific paper "Geopolymer Chemistry and Properties", published in Geopolymer '88, Vol. 1, pp.25–48, University of Technology, Compiègne (France).

Some geopolymer resins, brand GEOPOLYMITE, sold by the French company Geopolymere Sarl, still contain fluoro-elements. The chemical analysis of GEOPOLYMITE 50, for instance, displayed in Table I of Davidovits' patent U.S. Pat. No. 4,859,367 (equivalent to WO 88/02741) comprises 4.87% wt of F−. This value for fluoride is due to calcium fluoride $CaF_2$, as disclosed in the examples 1) and 2) of U.S. Pat. No. 4,509,985 (EP 153.097), the example 4 of U.S. Pat. No. 4,472,199 (EP 66.571). Calcium fluoride $CaF_2$ is entirely insoluble and essentially different From soluble sodium fluosilicate $Na_2SiF_6$ used in the present invention.

The geopolymeric compounds of the present invention have a very low shrinkage associated with very low water loss, during post heating. Without any filler, the shrinkage is 1.8% at 600° C., whereas geopolymers of the prior art would have been entirely cracked. When added with 60% wt of corrundum $Al_2O_3$, the shrinkage is as low as 0.03% at 600° C. When the geopolymer binder of the present invention is used as a matrix for fibrous composite materials, the shrinkage is lower than 0.01% at 600° C.

One explanation for the absence of any shrinkage and cracking could be the low amount of zeolitic water bound in the microstructure. This water would be replaced by F− ions and $SiO_2$ molecules in the tridimensional structure of poly(sialate-disiloxo), (M)-PSDS

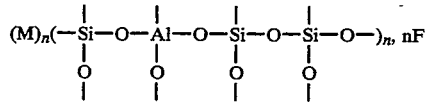

The method of this invention provides a fluoro-alumino-silicate geopolymer whose composition expressed in terms of oxides and in dehydrated form is:

$yM_2O:Al_2O_3:xSiO_2:wF^{2-}$ where $M_2O$ is $K_2O$ and/or $Na_2O$, "x" has a value between 5.5 and 75, "y" has a value between 1.0 and 20, "w" has a value between 0.5 and 50. After curing, the geopolymeric compound thus obtained is a solid solution comprising:

a) a geopolymer of the fluoro-alkaline poly(sialate-disiloxo) type (M,F)-PSDS of formula

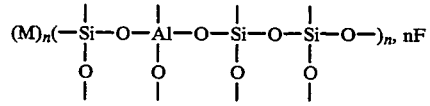

b) an alkaline-alumino-fluoride $M_3AlF_6$ like elpasolite $K_2NaAlF_6$;

c) a silicious phase $SiO_2$ of the Opal CT type, i.e. hydrous $SiO_2$;

where "M" represents the cations Na and/or K, and "n" the degree of polymerisation, the said alkali-fluoro poly(sialate-disiloxo) geopolymer has the Al cation in IV-fold coordination, of type Al4(Q4) as determined by MAS-NMR spectroscopy for $^{27}Al$, the said silicons phase of the Opal CT type has a dilatometric pattern characteristic of cristobalite $SiO_2$, and the said alkali-alumino-fluoride is characterised through its X-ray diffraction pattern.

The methods for obtaining the fluoro-alumino-silicate geopolymer binders consist of reacting or curing a geopolymeric resin obtained from a reactional mixture containing:

a) an aqueous solution of alkaline silicate with a molar ratio $M_2O:SiO_2$ between or equal to $M_2O:SiO_2$   1:4.0 and 1:6.5 the concentration of which is over 60% wt and where the initial viscosity at 20° C. is 200 centipoises, then increasing but not exceeding 500 centipoises before 5 hours at 20° C.;

b) an alumino-silicate oxide ($Si_2O_5, Al_2O_2$) in which the Al cation is in coordination (IV-V), as determined by the MAS-NMR spectrum for $^{27}Al$, c) sodium fluosilicate $Na_2SiF_6$.

The mixture a)+b)+c) has a water content lower than 30% wt and leads to a geopolymeric resin whose starting viscosity is in the 350–500 centipoise range, with oxide molar ratios between or equal to

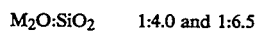

| | |
|---|---|
| $Al_2O_3:M_2O$ | 1:1.0 and 1:20 |
| $Al_2O_3:SiO_2$ | 1:5.5 and 1:75, |
| $M_2O:H_2O$ | 1:5.0 and 1:12.0 |
| $Al_2O_3:F^-$ | 1:0.5 and 1:50 | and then allowing the said geopolymeric resin to cure.

The inventors were surprised to discover that it is indeed possible to produce a concentrated alkaline silicate solution very rich in SiO$_2$, provided that the raw material used for this purpose is a type of silica fume, called thermal silica, different from amorphous silicas manufactured by condensing silane vapors or by precipitating silica solutions.

In the present invention, the term thermal silica fume designates exclusively the amorphous silica obtained by condensing SiO vapors resulting from very high temperature electro-fusion of silicious materials, generally at about 2000° C.; the said alkaline silicate is essentially obtained by dissolving the said thermal silica in a concentrated solution of NaOH and/or KOH.

In a preferred example of the invention, the thermal silica fume is prepared by electro-fusion of zircon sand.

Silica fumes manufactured by electro-fusion of other silicious compounds, for example ferro-silicon silica fume, may also be used. In this latter case, the silica fume must be treated in order to remove carbon and metallic silicon. In the following part of this specification thermal silica contains at most 10% by weight Al$_2$O$_3$ and at least 90% by weight SiO$_2$.

The properties of alkaline silicates are well disclosed in the prior art. For example, a paper published in *Industrial and Engineering Chemistry*, Vol. 61, No. 4, April 1969, pp. 29—44, "Properties of Soluble Silicates", outlines the physical properties of alkaline silicate solutions.

The major differences between alkaline silicate solutions of the prior art and those obtained in the present invention are displayed in the following table:

Viscosity at 20° C. and concentration for soluble alkaline silicates:

|  | molar ratio |  | viscosity | concentration |
|---|---|---|---|---|
| prior art | SiO$_2$:Na$_2$O | 4.0:1 | 200 cp | 25% |
|  | SiO$_2$:K$_2$O | 4.5:1 | 200 cp | 20% |
| present invention example 1) | SiO$_2$:K$_2$O | 5.6:1 | 200 cp | 69% |

Those soluble silicates produced with the method of the present invention are not stable with time. Their viscosity increases over time as a function of temperature. The starting viscosity is 200 cp at 20° C. and increases up to 500cp after 5 hours. This time, or pot-life, is sufficiently long to implement geopolymerization of poly(sialate-disiloxo) (M)-PSDS, Mn(—Si—O—Al—O—Si—O—Si—O—)n.

The second reagent required to implement the main object of the present invention is an alumino-silicate oxide (Si$_2$O$_5$,Al$_2$O$_2$) in which the Al cation is in (IV-V) fold coordination, as determined by MAS-NMR spectrography for $^{27}$Al; this alumino-silicate oxide (Si$_2$O$_5$,Al$_2$O$_2$) is obtained by thermal treatment in an oxidizing medium of natural hydrated aluminoosilicates, in which the cation Al is in (VI)-fold coordination, as determined by MAS-NMR spectrography for $^{27}$Al.

Thus the MAS-NMR spectrum for $^{27}$Al shows 2 peaks, one around 50–65 ppm characteristic of 4-coordinated Al, the other around 25–35 ppm, which some workers attribute to (V)-fold coordinated Al.

We shall, in what follows, adopt the convention of mixed coordination Al(IV-V) for this oxide (Si$_2$O$_5$,Al$_2$O$_2$).

The third reagent used in the present invention, sodium fluosilicate Na$_2$SiF$_6$ powder, has a double action. First, the prior art tells us that it reacts with alkaline silicates by precipitating colloidal silica SiO$_2$ with formation of sodium fluoride NaF or potassium fluoride KF.

Contrary to colloidal silica which is X-ray amorphous, alkaline fluorides are well crystallised elements easily detectable by X-ray diffraction. But the inventors were surprised to find no evidence of crystalline fluoride NaF and/or KF in the X-ray diagrams.

On contrast, X-ray diffraction shows the presence of fluoro-aluminates M$_3$AlF$_6$, cryolite Na$_3$AlF$_6$ for a sodium reactional mixture, or elpasolite K$_2$NaAlF$_6$ for a potassium reactional mixture (investigation carried out with powder diagram ASTM 22-1235).

Another surprise was to discover that sodium fluoride Na$_2$SiF$_6$ was actively slowing down the set-speed of the geopolymeric resin.

This effect was completely unexpected then it is known that sodium fluosilicate Na$_2$SiF$_6$ is used as a hardener for alkaline silicate based binders, with sometimes ultra-fast set.

In contrast, in the present invention, sodium fluoride is a set retarder. When comparing setting times of various geopolymeric reactional mixtures, with and without addition of Na$_2$SiF$_6$, it appears that the pot-life at 20° C. is highly lengthened. In our companion copending application (PCT/FR91/00177)filed on even date herewith, which describes a process for producing, poly(sialate-disiloxo) Mn(—Si—O—Al—O—Si—O—Si—O—)n,(M)-PSDS, the pot-life is 5–10 hours at 20° C. with a set time of 30 minutes at 60° C.

On contrast, the addition of 10% wt Na$_2$SiF$_6$ to the related mixtures leads to a pot-life lasting 48 hours at 20° C. and to a set time of 3 hours at 60° C.

The fluoro-aluminates M$_3$AlF$_6$, i.e. cryolite Na$_3$AlF$_6$ or elpasolite K$_2$NaAlF$_6$, result from the reaction of sodium fluosilicate with Al cations in (IV-V) fold coordination and also with amorphous (probably IV-V coordinated) Al$_2$O$_3$ contained in thermal silica. Their melting point is about 900° C., but some eutectica at 700° C. set the upper limit for the utilization of the present geopolymer binders.

Fluosilicate precipitates amorphous silica SiO$_2$ of the Opal CT type (cristobalite, trydimite). The cristobalitic character of the geopolymeric compound increases with the quantity of Opal CT. In the following description we defined the cristobalitic character by the intensity of the break which occurs at 200° C. on the dilatometric curve during the cooling phase (shrinkage). The concentration in SiO$_2$ of type Opal CT is a function of the intensity of this break and depends also on the coefficient of thermal expansion $\Delta\lambda.10^{-6}/°$ C. Depending on Opal CT concentration and thermal expansion coefficient $\Delta\lambda.10^{-6}/°$ C., one can distinguish between three categories of (K-Na,F)-PSDS geopolymer binders, namely:

a) $\Delta\lambda < 10.10^{-6}/°$ C., weak cristobalitic character; geopolymeric compounds comprising:

10 to 25 parts by weight of silicious phase SiO$_2$ of type Opal CT i.e. hydrous silica, 90 to 75 parts by weight of alkaline fluoro poly(sialate-disiloxo) (K,Na,F)-PSDS

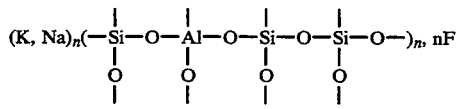

2 to 15 parts by weight of elpasolite $K_2NaAlF_6$ b) $10.10^{-6}/°C. < \Delta\lambda < 20.10^{-6}/°C.$, medium cristobalitic character; geopolymeric compounds comprising:

26 to 75 parts by weight of silicious phase $SiO_2$ of type Opal CT, 74 to 25 parts by weight of alkaline fluoro poly(sialate-disiloxo) (K,Na,F)-PSDS

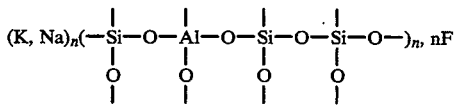

2 to 15 parts by weight of elpasolite $K_2NaAlF_6$ c) $\Delta\lambda > 20.10^{-6}/°C.$, high cristobalitic character; geopolymeric compounds comprising:

76 to 95 parts by weight of silicious phase $SiO_2$ of type Opal CT, 24 to 2 parts by weight of alkaline fluoro poly(sialate-disiloxo) (K,Na,F)-PSDS

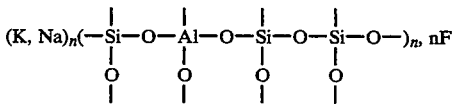

2 to 15 parts by weight of elpasolite $K_2NaAlF_6$

The prior art tells us how to produce alkaline silicate solutions with silica fume. However, the prior art is aimed at manufacturing stable solutions which may be stored and used commercially as silicate solutions. This explains why the molar ratios $M_2O:SiO_2$ are higher than 1:3.5 in the prior art, instead of being between 1:4.0 and 1:6.5 as required in the present invention. For example, the patents EP 059.088 or JP 74134599 (Chemical Abstracts 082:142233, 1975), JP 75140699 (Chemical Abstracts 084:137974, 1976) disclose processes for the manufacture of foundry binders with ferro-silicon silica fumes.

The viscosity of the geopolymeric binder claimed in the present invention increases with time and it cannot be stored. Therefore, the preferred method of the invention will consist in dissolving in several steps the thermal silica fume, allowing convenient storage of the various ingredients. In the preferred method the geopolymeric resin is produced after having prepared separately:

a) an aqueous potassium silicate solution with a molar ratio $K_2O:SiO_2$   1:1 with a 50% concentration;

b) a powder comprising the alumino-silicate oxide $(Si_2O_5, Al_2O_2)$ with the Al cation in (IV-V)-fold coordination as determined by MAS-NMR spectroscopy for $^{27}Al$, sodium fluosilicate $Na_2SiF_6$ and thermal fume silica $(15Si_2O_5, Al_2O_2)$.

The geopolymeric resin resulting from the mixture of a) +b) has a water content lower than by weight, the initial viscosity being in the 350–500 centipoise range and the oxide molar ratios comprised between or equal to:

| | |
|---|---|
| $Al_2O_3:M_2O$ | 1:1.0 and 1:20 |
| $Al_2O_3:SiO_2$ | 1:5.5 and 1:75 |
| $M_2O:H_2O$ | 1:5.0 and 1:12.0 |
| $Al_2O_3:F^-$ | 1:0.5 and 1:50 |

Maturation or aging of the said geopolymeric resin dissolves the said thermal silica; during the first step the viscosity decreases to reach a minimum at 250-300 centipoises, then it increases at the beginning of the geopolymerization step, the latter representing the utilisation phase for the geopolymer binder.

The very long pot-life of the geopolymeric resin is another surprise.

Whilst the quantity of sodium fluosilicate $Na_2SiF_6$ is relatively high, it does not precipitate the alkaline silicate solution. The geopolymeric resin may be stored for 48 hours at 20° C.

Alkaline hydroxide is either NaOH or KOH or a mixture NaOH+KOH, but KOH is preferred. According to the nature of the alkaline silicate, the poly(sialate-siloxo) (M,F)-PSDS $Mn(-Si-O-Al-O-Si-O-Si-O-)n,nF$, is either of the type (Na,F)-PSDS with sodium silicate, or of the type (K,F)-PSDS with potassium silicate, or else of the type (Na,K,F)-PSDS when both sodium and potassium silicates are produced in the reactional mixture.

The oxide molar ratios in the geopolymeric binder are a function of the desired thermal dilatation coefficient. In terms of the three categories defined hereabove, these ratios are:

| | | |
|---|---|---|
| a) | $\Delta\lambda < 10 \times 10^{-6}/°C.$, weak cristobalitic character; | |
| | $Al_2O_3:M_2O$ | 1:1.0 and 1:1.6 |
| | $Al_2O_3:SiO_2$ | 1:5.5 and 1:6.6 |
| | $M_2O:H_2O$ | 1:11.0 |
| | $Al_2O_3:F^-$ | 1:1 and 1:3 |
| b) | $10 \times 10^{-6}/°C., < \Delta\lambda < 20.10^{-6}/°C.$, medium cristobalitic character; | |
| | $Al_2O_3:M_2O$ | 1:1.65 and 1:3.0 |
| | $Al_2O_3: SiO_2$ | 1:6.65 and 1:10.95 |
| | $M_2O:H_2O$ | 1:6.35 |
| | $Al_2O_3:F^-$ | 1:3.10 and 1:7.95 |
| c) | $\Delta\lambda > 20 \times 10^{-6}/°C.$, high cristobalitic character; | |
| | $Al_2O_3:M_2O$ | 1:3.1 and 1:20 |
| | $Al_2O_3:SiO_2$ | 1:11 and 1:73 |
| | $M_2O:H_2O$ | 1:6.78 |
| | $Al_2O_3:F^-$ | 1:8.0 and 1:48 |

The following examples are illustrative of the present invention. They in no way reflect a limit to the overall scope of the invention as set out in the claims. All oxide ratios are molar ratios and all parts are by weight.

The thermal silica used in the examples results from the condensation and cooling of SiO and AlO vapors exhausting during electro-fusion of zircon sand. Chemical composition of this thermal silica is (main oxides parts by weight):

| | |
|---|---|
| $SiO_2$ | 94.24 |
| $Al_2O_3$ | 3.01 |
| $CaO$ | 0.04 |

-continued

| Loss of Ignition | 0.95 | which corresponds to a silico-aluminate oxide of formula $(15SiO_2,Al_2O_2)$.

EXAMPLE 1

A potassium silicate solution is prepared containing

| thermal silica | 152 g |
| KOH | 50 g |
| water | 82.4 g |

To minimize any exothermic self-heating of the mixture, KOH is added to water and the solution stored in the refrigerator until it reaches 5° C. Then, thermal silica $(15Si_2O_5,Al_2O_2)$ is added, the temperature being maintained at 5° C. during 90 minutes, and then brought to ambient temperature; viscosity is 200cp. When the temperature of the mixture is kept at 20° C., the solution thickens slowly to reach 500cp, after 5 hours. This mixture has following molar ratio:

| $K_2O:SiO_2$ = | 1:5.6 |
| $K_2O:H_2O$ = | 1:11.2 |

The solid concentration is 69% by weight.

EXAMPLE 2

To 285g of the solution of Example 1, are added 45g of alumino-silicate oxide $(Si_2O_5,Al_2O_2)$ with the Al cation in (IV–V)-fold coordination, as determined by $^{27}Al$ MAS-NMR spectroscopy. The viscosity of the obtained geopolymeric resin is 395cp; it is cast in a mold and cured at 60° C., for 30 minutes, then demolded and dried at 60° C. The density of the geopolymer compound is $d=1.45g/ml$.

EXAMPLE 3

To 285g of the solution of Example 1, are added 45g of alumino-silicate oxide $(Si_2O_5,Al_2O_2)$ with the Al cation in (IV–V)-fold coordination, as determined by $^{27}Al$ MAS-NMR spectroscopy, and 45 g sodium fluosilicate in powder, $Na_2SiF_6$.

The viscosity of the obtained geopolymeric resin is 450cp; it is cast in a mold and cured at 60° C., for 3 hours, then demolded and dried at 60° C. The density of the geopolymer compound is $d=1.70g/ml$.

EXAMPLE 4

A potassium silicate solution is prepared with thermal silica and KOH, the obtained molar ratio is $K_2O:SiO_2=1$ and the solid concentration $SiO_2+K_2O$, is 50%. This solution remains stable for a long time and may be stored.

EXAMPLE 5

To the solution of Example 4, is added
thermal silica
alumino-silicate oxide $(Si_2O_5,Al_2O_2)$ with the Al cation in (IV–V)-fold coordination, as determined by $^{27}Al$ MAS-NMR spectroscopy,
sodium fluosilicate $Na_2SiF_6$
the said reactants being added to the reactional mixture in quantities yielding the following molar ratios

| $Al_2O_3:M_2O$ | 1:2.44 |
| $Al_2O_3:SiO_2$ | 1:9.37 |
| $M_2O:H_2O$ | 1:6.35 |
| $Al_2O_3:F^-$ | 1:5.94 |

The obtained geopolymeric resin has a water content of 17.5 and a starting viscosity of 400 centipoises.

With aging and dissolution of thermal silica, the viscosity decreases to reach a minimum value at 250–300 centipoises, then increases at the beginning of the geopolymerization phase, the latter being the utilization stage of the geopolymeric resin. The pot-life is 48 hours at 20° C.

It is cast in a mold and cured at 60° C., for 3 hours, then demolded and dried at 60° C. The density of the geopolymeric compound is $d=1.70g/mi$.

Dilatometric investigation shows that the first shrinkage has a value in the range of 2%, without any addition of fillers. The material has no crack after post-heating at 600° C. After dehydroxylation, the cooling curve (shrinkage) show the characteristic cristobalite break at 210° C. The linear thermal dilatation coefficient is $\Delta\lambda = 15.10^{-6}/°$ C.

The geopolymeric compound belongs to the medium cristobalitic category and comprises:

| (K,Na)-PSDS | 40% |
| Opal CT (hydrous $SiO_2$) | 35% |
| Elpasolite | 12% |
| water qsp | 100% |

EXAMPLE 6

To the solution of Example 4, is added
thermal silica
sodium fluosilicate $Na_2SiF_6$
the said reactants being added to the reactional mixture in quantities yielding following molar ratio

| $Al_2O_3:M_2O$ | 1:20 |
| $Al_2O_3:SiO_2$ | 1:73 |
| $M_2O:H_2O$ | 1:6.78 |
| $Al_2O_3:F^-$ | 1:48 |

The obtained geopolymeric resin has a water content of 26.5% and a starting viscosity of 350 centipoises.

With aging and dissolution of thermal silica, the viscosity decreases to reach a minimum value at 250 centipoises, then increases at the beginning of the geopolymerization phase, the latter being the utilization stage of the geopolymeric resin. The pot-life is 48 hours at 20° C.

It is cast in a mold and cured at 60° C., for 4 hours, then demolded and dried at 60° C. The density of the geopolymeric compound is $d=1.85g/mi$.

Dilatometric investigation shows that the first shrinkage has a value in the range of 1.8%, without any addition of fillers. The material has no crack after post-heating at 600° C. After dehydroxylation, the cooling curve (shrinkage) shows the characteristic cristobalite break at 210° C. The linear thermal dilatation coefficient is $\Delta\lambda = 30.10^{-6}/°$ C.

The geopolymeric compound belongs to the high cristobalitic category and comprises:

| (K,Na)-PSDS | 3.56% |

|   |   |
|---|---|
| Opal CT | 78% |
| Elpasolite | 3.5% |
| water qsp | 100% |

EXAMPLE 7

To the solution of Example 4, is added
thermal silica
alumino-silicate oxide ($Si_2O_5,Al_2O_2$) with the Al cation in (IV-V)-fold coordination, as determined by $^{27}Al$ MAS-NMR spectroscopy,
sodium fluosilicate $Na_2SiF_6$
the said reactants being added to the reactional mixture in quantities yielding following molar ratio

|   |   |
|---|---|
| $Al_2O_3:M_2O$ | 1:1.71 |
| $Al_2O_3:SiO_2$ | 1:6.28 |
| $M_2O:H_2O$ | 1:11 |
| $Al_2O_3:F^-$ | 1:1.55 |

The obtained geopolymeric resin has a water content of 23.5% and a starting viscosity of 480 centipoises.

With aging and dissolution of thermal silica, the viscosity decreases to reach a minimum value at 300 centipoises, then increases at the beginning of the geopolymerization phase, the latter being the utilization stage of the geopolymeric resin. The pot-life is 48 hours at 20° C.

It is cast in a mold and cured at 60° C., for 3 hours, then demolded and dried at 60° C. The density of the geopolymeric compound is d=1.60g/mi.

Dilatometric investigation shows that the first shrinkage has a value in the range of 2.7%, without any addition of fillers. The material has no crack after post-heating at 600° C. After dehydroxylation, the cooling curve (shrinkage) shows the characteristic cristobalite break at 210° C. The linear thermal dilatation coefficient is $\Delta\lambda = 7.10^{-6}/°C$.

The geopolymeric compound belongs to the medium cristobalitic category and comprises:

|   |   |
|---|---|
| (K,Na)-PSDS | 79% |
| Opal CT | 11% |
| Elpasolite | 6.5% |
| water qsp | 100% |

Any workers in the field will understand the usefulness of this process for obtaining temperature-stable geopolymers, when compared with the geopolymers of the prior art. Also, in contrast to the prior art, the fact that there is no need to add fillers to prevent the geopolymeric matrix from cracking makes it possible to keep a very low viscosity in the geopolymeric resin, which is a distinct advantage when fibers or other granular materials are to be impregnated. The absence of any shrinkage due to dehydration and dehydroxylation up to 600° C. is another distinct advantage for the materials manufactures with this binder. It allows a perfect relation to be kept between the dilatometric behaviour of fillers or fiber reinforcements and geopolymeric compounds respectively, and to determine precisely the linear expansion coefficient for any geopolymeric compound. The coefficient $\Delta\lambda$ ranges from $5.10^{-6}/°C$ and $35.10^{-6}/°C$ which allows the use of either materials bearing low expansion values such as vitreous silica, carbon fiber of SiC fiber or materials with high expansion such as metals, or those with medium expansion such as glass and ceramics.

The binder of the present invention allows the manufacture of sandwich structures made of external layers possessing the same expansion coefficient as the internal layer, at a given temperature.

Naturally, various modifications can be introduced to the method described above, by workers in the field, while remaining within the terms of the invention.

We claim:

1. A fluoro-alumino-silicate geopolymer compound whose composition expressed in terms of oxides and in fully dehydrated form is:

$$yM_2O:Al_2O_3:xSiO_2:wF^{2-}$$

"x" has a value between 5.5 and 75, "y" has a value comprised between 1.0 and 20, "w" has a value between 0.5 and 50, wherein after curing, the said geopolymer binder consists essentially of:

a) a geopolymer fluro-alkaline poly(sialate-disiloxo) type, (M,F)-PSDS, of formula

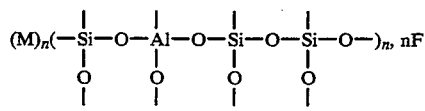

b) an alkaline-alumino-fluoride $M_3AlF_6$,
c) a silicious phase of the hydrous $SiO_2$;
where "M" represents the cations Na and/or K, "n" the degree of polymerisation, the said alkali-fluoro poly(sialate-disiloxo) geopolymer having the Al cation in IV-fold coordination, of Al4(Q4) as determined by MAS-NMR spectroscopy for $^{27}Al$, the said silicous phase of hydrous $SiO_2$ having a dilatometric pattern characteristic of cristobalite $SiO_2$.

2. A geopolymeric compound according to claim 1, wherein "M" is Na and the said alkaline alumino-fluoride is cryolite $Na_3AlF_6$.

3. A geopolymeric compound according to claim 1, wherein "M" is a mixture of Na and K and the said alkaline alumino-fluoride is elpasolite $K_2NaAlF_6$.

4. A geopolymeric compound according to claim 3, comprising:

10 to 95 parts by weight of silicious phase hydrous $SiO_2$, 2 to 90 parts by weight of alkaline fluoro poly(sialate-disiloxo), (K, Na,F)-PSDS

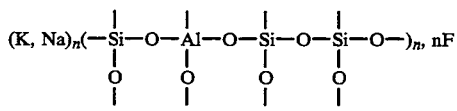

2 to 15 parts by weight of elpasolite $K_2NaAlF_6$.

5. A geopolymeric compound according to claim 3, comprising:

10 to 25 parts by weight of silicious phase hydrous $SiO_2$, 90 to 75 parts by weight of alkaline fluoro poly(sialate-disiloxo),(K, Na,F)-PSDS

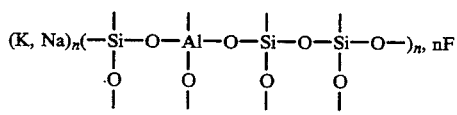

2 to 15 parts by weight of elpasolite $K_2NaAlF_6$, wherein said geopolymeric compound has a thermal expansion coefficient $\Delta\lambda < 10 \times 10^{-6}/°C$.

6. A geopolymeric compound according to claim 3, comprising:

26 to 75 parts by weight of silicious phase hydrous $SiO_2$, 74 to 25 parts by weight of alkaline fluoro poly(sialate-disiloxo),(K,Na,F)-PSDS

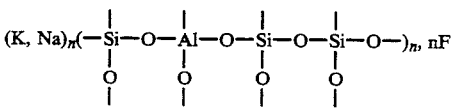

2 to 15 parts by weight of elpasolite $K_2NaAlF_6$ wherein said geopolymeric compound has a thermal expansion coefficient $10 \times 10^{-6}/°C < \Delta\lambda < 20 \times 10^{-6}/°C$.

7. A geopolymeric compound according to claim 3, comprising:

76 to 95 parts by weight of silicious phase hydrous $SiO_2$, 24 to 2 parts by weight of alkaline fluoro poly(sialate-disiloxo),(K, Na, F)-PSDS

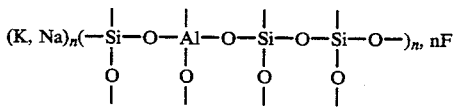

2 to 15 parts by weight of elpasolite $K_2NaAlF_6$ wherein said geopolymeric compound has a thermal expansion coefficient $\Delta\lambda > 20 \times 10^{-6}/°C$.

8. A method for obtaining a fluoro-alumino-silicate geopolymer compound according to claim 1 which comprises reacting together reactional mixture containing:

a) an aqueous solution of alkaline silicate with a molar ratio $M_2O:SiO_2$ between $M_2O:SiO_2$    4.0 and 1:6.5 having concentration in water of over 60% wt and wherein the initial viscosity at 20° C. is 200 centipoises, then increases but does not exceed 500 centipoises within 5 hours at 20° C.;

b) an alumino-silicate oxide $(Si_2O_5,Al_2O_2)$ in which the Al cation is in coordination (IV–V), as determined by the MAS-NMR spectrum for $^{27}Al$, c) sodium fluosilicate $Na_2SiF_6$, wherein the mixture a)+b)+c) has a water content lower than 30% wt and leads to a geopolymeric resin whose viscosity is in the 350-500 centipoises, with oxide molar ratios between $Al_2O_3:M_2O$    1:1.0 and 1:20

| | |
|---|---|
| $Al_2O_3:SiO_2$ | 1:5.5 and 1:75 |
| $M_2O:H_2O$ | 1:5.0 and 1:12.0 |
| $Al_2O_3:F^-$ | 1:0.5 and 1:50 | and then allowing the said geopolymeric resin to cure.

9. A method for obtaining a geopolymer binder from a geopolymer compound according to claim 1, wherein the geopolymeric resin is obtained by mixing:

a) an aqueous potassium silicate solution having a molar ratio $K_2O:SiO_2$    1:1 having a 50% concentration in water;

b) a powder comprising the alumino-silicate oxide $(Si_2O_5,Al_2O_2)$ with the Al cation in (IV–V)-fold coordination as determined by MAS-NMR spectroscopy for $^{27}Al$, sodium fluosilicate $Na_2SiF_6$ and thermal fume silica $(15Si_2O_5,Al_2O_2)$;

the geopolymeric resin resulting from the mixture of a)+b) has a water content lower than 30% by weight, the initial viscosity being in the 350–500 centipoises range and the oxide molar ratios between:

| | |
|---|---|
| $Al_2O_3:M_2O$ | 1:1.0 and 1:20 |
| $Al_2O_3:SiO_2$ | 1:5.5 and 1:75 |
| $M_2O:H_2O$ | 1:5.0 and 1:12.0 |
| $Al_2O_3:F^-$ | 1:0.5 and 1:50 | aging of the said geopolymeric resin to dissolve the said thermal silica; wherein during a first step of said aging the viscosity decreases to reach a minimum at 250–300 centipoises, then increases at the beginning of geopolymerization.

10. A method for obtaining a geopolymer binder form a geopolymer compound according to claim 9, wherein the geopolymeric resin is obtained by mixing:

a) an aqueous potassium silicate solution having a molar ratio $K_2O:SiO_2$    1:1 having a 50% concentration in water;

b) a powder comprising the alumino-silicate oxide $(Si_2O_5,Al_2O_2)$ with the Al cation in (IV–V)-fold coordination as determined by MAS-NMR spectroscopy for $^{27}Al$, sodium fluosilicate $Na_2SiF_6$ and thermal fume silica $(15Si_2O_5,Al_2O_2)$;

the geopolymer resin resulting from the mixture of a)+b) has a water content lower than 30% by weight, the initial viscosity being in the 350–500 centipoises range and the oxide molar ratios between:

| | |
|---|---|
| $Al_2O_3:M_2O$ | 1:1.0 and 1:1.6 |
| $Al_2O_3:SiO_2$ | 1:5.5 and 1:6.6 |
| $M_2O:H_2O$ | 1:11.0 |
| $Al_2O_3:F^-$ | 1:1 and 1:3 | aging of the said geopolymer resin to dissolve the said thermal silica; wherein during a first step of said aging the viscosity decreases to reach a minimum at 250–300 centipoises, then increases at the beginning of geopolymerization.

11. A method for obtaining a geopolymer binder form a geopolymer compound according to claim 9, wherein the geopolymer resin is obtained by mixing:

a) an aqueous potassium silicate solution having a molar ratio $K_2O:SiO_2$  1:1 having a 50% concentration;

b) a powder comprising the alumino-silicate oxide $(Si_2O_5,Al_2O_2)$ with the Al cation in (IV–V)-fold coordination as determined by MAS-NMR spectroscopy for $^{27}Al$, sodium fluosilicate $Na_2SiF_6$ and thermal fume silica $(15Si_2O_5,Al_2O_2)$;

the geopolymer resin resulting from the mixture of a) +b) has a water content lower than 30% by weight, the initial viscosity being in the 350–500 centipoises range and the oxide molar ratios between:

| | |
|---|---|
| $Al_2O_3:M_2O$ | 1:1.65 and 1:3.0 |
| $Al_2O_3:SiO_2$ | 1:6.65 and 1:10.95 |
| $M_2O:H_2O$ | 1:6.35 |
| $Al_2O_3:F^-$ | 1:3.10 and 1:7.95 | aging of the said geopolymer resin to dissolves the said thermal silica; wherein during a first step of said aging the viscosity decreases to reach a minimum at 250–300 centipoises, then increases at the beginning of geopolymerization.

12. A method for obtaining a geopolymer binder from a geopolymer compound according to claim 9 wherein the geopolymeric resin is obtained by mixing:

a) an aqueous potassium silicate solution having a molar ratio $K_2O:SiO_2$  1:1 having a 50% concentration in water;

b) a powder comprising the alumino-silicate oxide $(Si_2O_5,Al_2O_2)$ with the Al cation in (IV–V)-fold coordination as determined by MAS-NMR spectroscopy for $^{27}Al$, sodium fluosilicate $Na_2SiF_6$ and thermal fume silica $(15Si_2O_5,Al_2O_2)$;

the geopolymer resin resulting from the mixture of a) +b) has a water content lower than 30% by weight, the initial viscosity being in the 350–500 centipoises range and the oxide molar ratios between:

| | |
|---|---|
| $Al_2O_3:M_2O$ | 1:3.1 and 1:20 |
| $Al_2O_3:SiO_2$ | 1:11 and 1:73 |
| $M_2O:H_2O$ | 1:6.78 |
| $Al_2O_3:F^-$ | 1:8.0 and 1:48 | aging of the said geopolymer resin to dissolves the said thermal silica; wherein during a first step of said aging the viscosity decreases to reach a minimum at 250–300 centipoises, then increases at the beginning of geopolymerization.

13. An item in any shape and dimension produced by hardening a geopolymer, said geopolymer being produced according to claim 8, comprising agglomerating said geopolymer with a mineral-, a metallic and/or organic filler, or impregnating fibers, non-wovens, felts or fabric with said geopolymer prior to said hardening.

14. Surface layer containing one geopolymeric compound according to claim 1.

15. An item in any shape and dimension produced by hardening a geopolymer binder according to claim 9, to agglomerate mineral-, metallic and/or organic fillers, or impregnate fibers, non-wovens, felts or fabrics, said geopolymeric binder comprising 10 to 25 parts by weight of silicious phase hydrous $SiO_2$, 90 to 75 parts by weight of alkaline fluoro poly(sialate-disiloxo), (K,Na,F)-PSDS

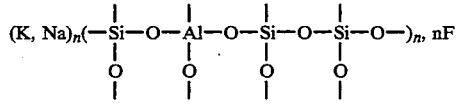

2 to 15 parts by weight of elpasolite $K_2NaAlF_6$, wherein said geopolymeric binder has a thermal expansion coefficient of $\Delta\lambda < 10.10^{-6}/°$ C.

16. An item in any shape and dimension produced by hardening a geopolymer binder according to claim 11, to agglomerate minerals-, metallic and/or organic fillers, or impregnate fibers, non-wovens, felts or fabrics, said geopolymeric binder comprising 26 to 75 parts by weight of silicious phase hydrous $SiO_2$, 74 to 25 parts by weight of alkaline fluoro poly(sialate-disiloxo), (K,Na,F)-PSDS

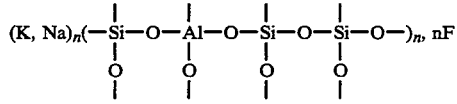

2 to 15 parts by weight of elpasolite $K_2NaAlF_6$, wherein said geopolymeric binder has a thermal expansion coefficient of $10.10^{-6}/° < \Delta\lambda < 20.10^{-6}/°$ C.

17. An item in any shape and dimension produced by hardening a geopolymer binder according to claim 12, to agglomerate mineral-, metallic and/or organic fillers, or impregnate fibers, non-wovens, felts or fabrics, said geopolymeric binder comprising 76 to 95 parts by weight of silicious phase hydrous $SiO_2$, 24 to 2 parts by weight of alkaline fluoro poly(sialate-disiloxo, (K,Na,F)-PSDS

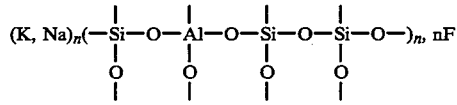

2 to 15 parts by weight of elpasolite $K_2NaAlF_6$, wherein said geopolymeric binder has a thermal expansion coefficient of $\Delta\lambda > 20.10^{-6}/°$ C.

18. A surface layer containing a geopolymeric compound according to claim 2.

19. A surface layer containing a geopolymeric compound according to claim 3.

20. A surface layer containing a geopolymeric compound according to claim 4.